United States Patent Office 3,559,008
Patented Jan. 26, 1971

3,559,008
VOLTAGE PROPORTIONAL SPEED CONTROL OF THE OUTPUT OF A DIFFERENTIAL GEAR CONNECTED TO TWO MOTORS UTILIZING A PULSE WIDTH MODULATOR CONTROL
Hans Stut, Lochheim, near Munich, and Reimer Emeis, Ebermannstadt, Germany, assignors to Siemens Aktiengesellschaft, a corporation of Germany
Filed June 7, 1968, Ser. No. 735,228
Claims priority, application Germany, June 9, 1967,
S 110,253
Int. Cl. H02p 7/68
U.S. Cl. 318—8                                          5 Claims

ABSTRACT OF THE DISCLOSURE

A pair of DC motors are coupled to a shaft via a differential drive. One of the motors is energized via a first motor energizing circuit which includes a first switch. The other of the motors is energized via a second motor energizing circuit which includes a second switch. Control circuitry connected to the first and second switches controls their condition in accordance with a control voltage provided by the control circuitry.

DESCRIPTION OF THE INVENTION

Figure 1:
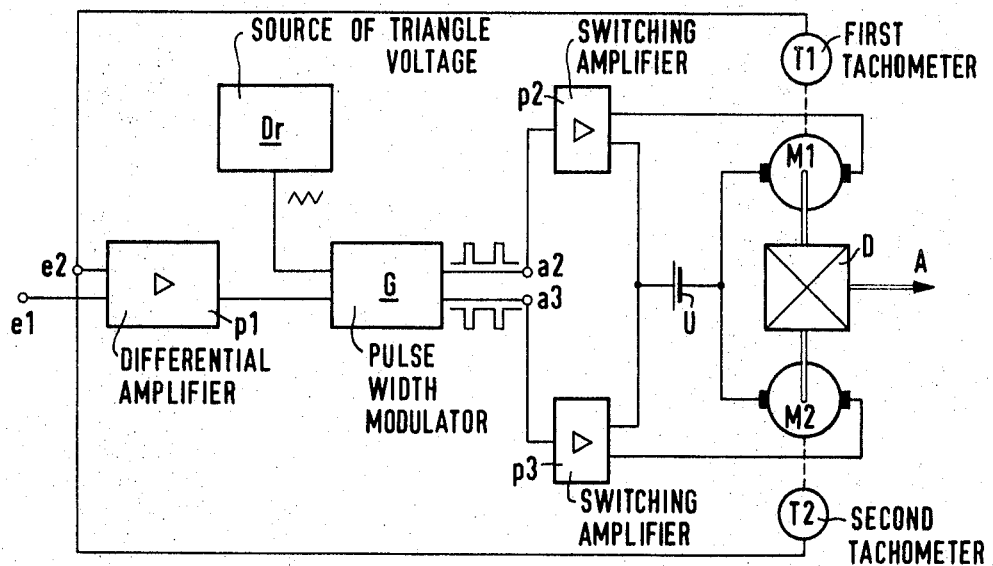

The present invention relates to apparatus for controlling the rotary speed of a shaft. More particularly, the present invention relates to apparatus for voltage-proportional control of the rotary speed of a shaft.

In the field of control of the rotary speed of a shaft, said rotary speed must frequently be proportional to a control voltage. To attain this, DC motors are often utilized, since there is good proportionality between the rotary speed of a DC motor and the energizing voltage thereof in a very wide range of speeds. The proportionality is absent, however, at very low rotary speeds. Thus, a DC motor cannot provide adequate control at low voltages, and such a motor will start in the opposite direction only at a specific negative voltage. The ratio of rotary speed to energizing voltage of a DC motor thus has a hysteresis in the vicinity of zero rotary speed. This is a disadvantage especially in control systems which have the most exacting requirements as far as accuracy is concerned.

The foregoing type of control problem occurs, for example, during the tuning of a high frequency transmitter of a zone pulling plant for producing hyperpure silicon. Such a pulling plant converts polycrystalline silicon into monocrystalline silicon by heating a zone of the polycrystalline silicon body up to melting temperature, for example, by utilizing a high frequency field produced by a winding which is moved relative to said polycrystalline silicon body. The quality of the monocrystalline silicon provided by the process is affected by negligible changes in the temperature of the molten zone. It is therefore desirable to maintain the temperature as constant as possible by regulating the energy supplied. This may be achieved, for example, by varying the capacitance of a capacitor of the high frequency transmitter, thereby varying the power output of said transmitter. Apparatus of the prior art has been completely unable to provide the desired precision of adjustment or variation of the output power of the transmitter, however.

The principal object of the present invention is to provide new and improved apparatus for controlling the rotary speed of a shaft.

An object of the present invention is to provide new and improved apparatus for providing voltage-proportional control of the rotary speed of a shaft.

An object of the present invention is to provide apparatus which controls the rotary speed of a shaft without the disadvantage of the apparatus of the prior art.

An object of the present invention is to provide apparatus which controls the rotary speed of a shaft with considerable accuracy, efficiency and reliability even at rotary speeds which are very close to zero.

An object of the present invention is to provide apparatus for voltage-proportional control of the rotary speed of a shaft throughout the range of speeds of said shaft with efficiency, accuracy, effectiveness and reliability.

An object of the present invention is to provide apparatus for controlling the rotary speed of a shaft in proportion with a control voltage.

Another object of the present invention is to provide apparatus for meeting all the requirements for regulation of a zone-melting operation, especially for producing monocrystalline hyperpure silicon.

In accordance with the present invention, apparatus for voltage-proportional control of the rotary speed of a shaft comprises a pair of DC motors coupled to the shaft via a differential drive. A first motor energizing circuit for one of the motors includes a source of electrical energy and a first switch connected in series with the one of the motors and the source of electrical energy. A second motor energizing circuit for the other of the motors includes a source of electrical energy and a second switch connected in series with the other of the motors and the source of electrical energy. A control circuit connected to the first and second switches controls the condition of the first and second switches in accordance with a control voltage provided by the control circuit.

Each of the first and second switches has a conductive condition and a non-conductive condition. Each of the switches connects the corresponding motor to its source of electrical energy thereby energizing the motor when the switch is in its conductive condition. The control circuit includes a pulse width modulator for periodically providing pulses having durations proportional to the control voltage. The pulse width modulator has first and second outputs each providing a pulse which is inverse to that provided by the other. The first switch comprises a first switching amplifier connected to the first output of the pulse width modulator. The second switch comprises a second switching amplifier connected to the second output of the pulse width modulator.

The control circuit comprises a reference voltage source, pilot apparatus for providing an operating voltage from the first and second motors and a pulse width modulator connected to the first and second switches. The pulse width modulator periodically provides pulses proportional to the difference between the reference voltage and the operating voltage and is connected to the reference voltage source and the pilot apparatus. The reference voltage source is connected to the first input of a differential amplifier. The pilot apparatus comprises tachometers coupled to the first and second motors for providing voltages proportional to the rotary speed of the motors. The tachometers are connected to the second input of the differential amplifier. The output of the differential amplifier is connected to the pulse width modulator and provides a control voltage proportional to the difference between the reference and operating voltages. The pulse width modulator has an input connected to a source of sawtooth voltage and an input connected to the output of the differential amplifier.

Figure 2:
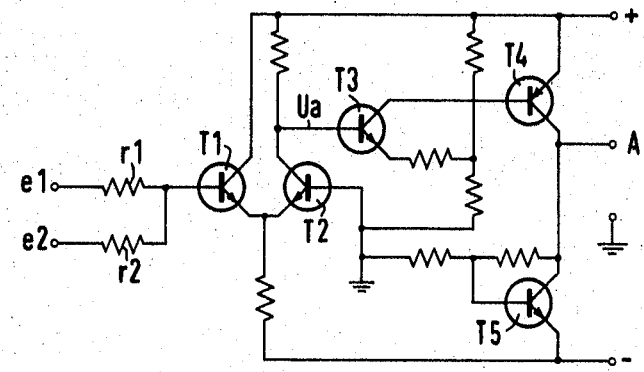
Figure 3:
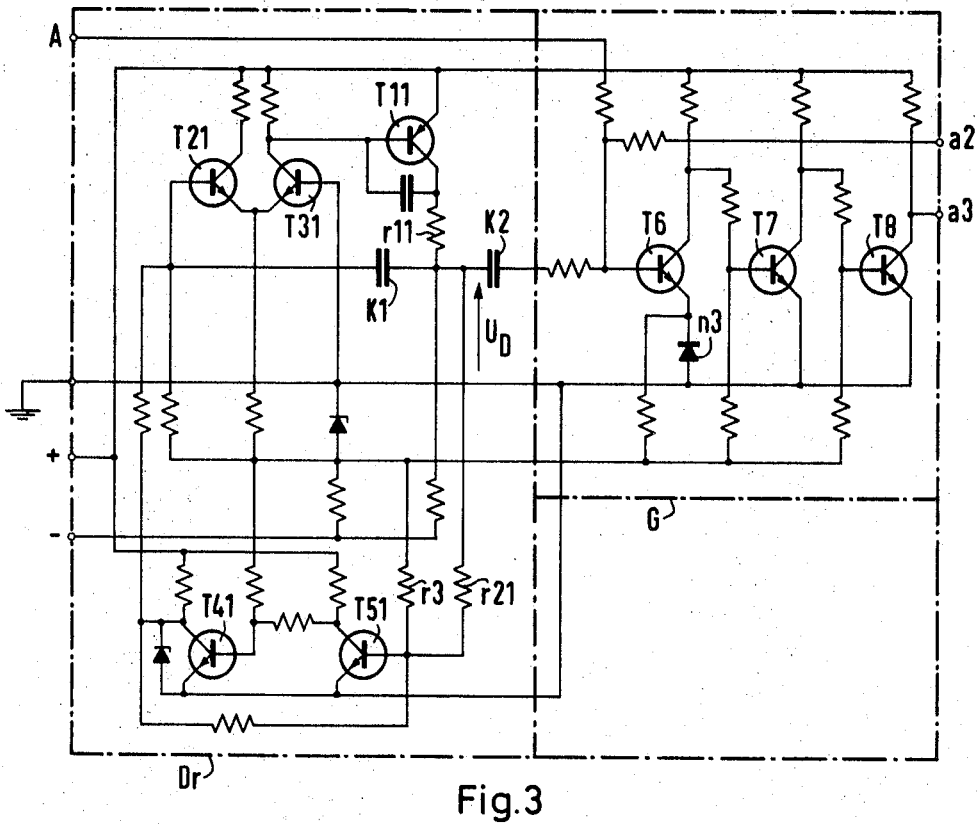

In order that the present invention may be readily carried into effect, it will now be described with reference to the accompanying drawings, wherein:

FIG. 1 is a block diagram of an embodiment of the apparatus of the present invention for voltage-proportional control of the rotary speed of a shaft;

FIG. 2 is a circuit diagram of an embodiment of a differential amplifier which may be utilized as the differential amplifier $p1$ of the embodiment of FIG. 1; and FIG. 3 is a circuit diagram of an embodiment of a source of triangle voltage and an embodiment of a pulse width modulator which may be utilized as the source of triangle voltage $Dr$ and the pulse width modulator G of the embodiment of FIG. 1.

In FIG. 1, a drive shaft A is driven by a pair of DC motors M1 and M2 via a differential drive D. The first motor M1 is connected in series circuit arrangement with a source U of DC voltage and a switch $p2$. The second motor M2 is connected in series circuit arrangement with the source U of DC voltage and a switch $p3$.

The first and second switches $p2$ and $p3$ are controlled by pulses provided by a pulse width modulator G. The pulse width modulator G supplies inverse identical pulses at two outputs $a2$ and $a3$, so that pulses are supplied to each of the first and second switches $p2$ and $p3$ to control said switches, said pulses being inverse to each other. The pulse width modulator G has two inputs. One of the inputs of the pulse width modulator G is connected to the output of a source of saw-tooth voltage $Dr$ and the other of the inputs of said pulse width modulator is connected to the output of a differential amplifier $p1$.

Each of the first and second switches $p2$ and $p3$ comprises a switching amplifier which is identical with the other. Each of the first and second switches $p2$ and $p3$ has a conductive condition and a non-conductive condition and is switched by a control voltage from its non-conductive condition to its conductive condition and vice versa. When the first switch $p2$ is in its conductive condition, it connects the first motor M1 to the source U of electrical energy thereby energizing said motor. When the second switch $p3$ is in its conductive condition, it connects the second motor M2 to the source U of electrical energy, thereby energizing said motor. Each of the switches $p2$ and $p3$ may comprise any suitable switching arrangement which may be controlled in its conductive condition by a control voltage.

The source $Dr$ of triangle voltage applies a triangle voltage to the pulse width modulator G. The pulse width modulator is supplied, via the differential amplifier $p1$, with a voltage which is proportional to the control voltage. The pulse width modulator G functions to compare the triangle voltage with the output voltage of the differential amplifier $p1$ and provides an output voltage pulse at one of its outputs $a2$ and $a3$ when the triangle voltage exceeds the voltage received from the differential amplifier $p1$ in magnitude. The pulse width modulator G provides an output voltage pulse in the other of its outputs when the voltage received from the differential amplifier $p1$ exceeds the triangle voltage in magnitude.

The differential amplifier $p1$ has two inputs $e1$ and $e2$. A reference or datum value voltage is applied to the first input $e1$ of the differential amplifier. A first tachometer T1 is coupled to the first motor M1. A second tachometer T2 is coupled to the second motor M2. Each of the first and second tachometers T1 and T2 provides a voltage proportional to the rotary speed of the corresponding motor. The first and second tachometers T1 and T2 are connected to the second input $e2$ of the differential amplifier $p1$. The differential amplifier $p1$ functions to provide at its output a control voltage which is proportional to the difference between the reference and operating voltages. The tachometers T1 and T2 provide operating or pilot voltages which are indicative of the actual speeds of the corresponding motors. The outputs of the first and second tachometers T1 and T2 are applied to the second input $e2$ of the differential amplifier $p1$ in common and in series opposition to each other so that the difference of the voltages provided by said tachometers is the pilot or operating voltage representing the actual speed of the motors in said differential amplifier. The differential amplifier $p1$ is adjusted so that when the reference voltage and the operating or pilot voltage coincide in magnitude, said differential amplifier provides an output voltage having a magnitude which is one-half the magnitude of the triangle voltage provided by the source of triangle voltage $Dr$. Thus, when the rotary speed of the shaft A is exactly that desired, so that there is no deviation between the reference and operating voltages, the pulses provided by the pulse width modulator G at its outputs $a2$ and $a3$ are identical, and said shaft is not varied in rotary speed.

If the second motor M2 is assumed to be at standstill and the first motor M1 is rotating at its maximum rotary speed, the shaft A is driven at its maximum rotary speed. The motor M1 is energized at full energizing voltage, the switch $p2$ being in its conductive condition, and the motor M2 is not energized, the switch $p3$ being in its non-conductive condition. Under these circumstances, there is no voltage at the output $a3$ of the pulse width modulator G. The output voltage of the differential amplifier $p1$ is at least as high in magnitude as the triangle voltage provided by the source $Dr$ of triangle voltage.

If the rotary speed of the shaft A is to be decreased, the ratio of the output voltages of the pulse width modulator G at its outputs $a2$ and $a3$ is varied to a value wherein the magnitude of the output voltage of the differential amplifier $p1$ is less than the magnitude of the triangle voltage. This is caused by a reduction in the output voltage of the differential amplifier $p1$. The time integral of the output voltage of the pulse width modulator at the output $a2$ decreases linearly with the output voltage of the differential amplifier $p1$ to the same degree that the time integral of the output voltage at the output $a3$ increases. If both time integrals are equal, that is, if both motors M1 and M2 are supplied with the same voltage, the shaft A is held at standstill. The output voltage of the differential amplifier $p1$ is thus adjusted to have half the magnitude of the triangle voltage produced by the source of triangle voltage, as hereinbefore stated.

If the direction of rotation of the drive shaft A is to be reversed, the time integral of the voltage at the output $a3$ of the pulse width modulator G must be larger than the time integral of the voltage at the output $a2$. To accomplish this, the output voltage of the differential amplifier $p1$ must be made smaller in magnitude than half the triangle voltage provided by the source $Dr$ of triangle voltage. The maximum rotary speed of the shaft A is obtained in the opposite direction when the output voltage at the output $a2$ is zero and a full output voltage is provided at the output $a3$. The switch $p3$ is then maintained in its conductive condition and the switch $p2$ is then maintained in its non-conductive condition.

The approximation of the rotary speed of the shaft A to zero is exactly proportional, since both motors M1 and M2 function linearly at approximately one-half the maximum rotary speed. Only during the maximum rotary speed in a positive and negative direction is the rotary speed of the drive shaft A no longer exactly proportional to the control voltage, since one of the motors is then at a standstill and functions in accordance with the aforementioned hysteresis. This is not of importance, however, since the primary consideration in the control apparatus is linearity within the range of zero rotary speed.

A differential amplifier which may be utilized as the differential amplifier $p1$ of FIG. 1 is shown in FIG. 2. In FIG. 2, the reference or datum voltage is applied via the first input $e1$ and the operating or pilot voltage is applied via the second input $e2$. The reference and operating voltages are superimposed on each other via a pair of resistors $r1$ and $r2$ and the superimposed voltage is applied to the base electrode of a transistor T1. The transistor T1 forms a differential amplifier of known type with a second transistor T2. The differential amplifier is adjusted so that when the input voltage is zero, that is when the voltage at the input terminal E1 is equal to the voltage at the input terminal E2 but is in opposite polarity, the output voltage $U_a$ at the collector electrode of the transistor T2 is zero. At a positive input voltage, the output voltage $U_a$ becomes positive. At a negative input voltage, the output voltage $U_a$ becomes negative.

A transistor T3 functions to amplify the output voltage $U_a$. The output voltage of the transistor T3 is further amplified by a transistor T4. An additional transistor T5 functions to provide a high resistance for the transistor T4. The amplified output voltage, derived from the difference between the two input voltages at the inputs E1 and E2, is provided at an output terminal A.

FIG. 3 is a source of triangle voltage or a triangle voltage generator which may be utilized as a source of triangle voltage $Dr$ of the embodiment of FIG. 1, and is also a pulse width modulator which may be used as the pulse width modulator G of the embodiment of FIG. 1. The triangle generator $Dr$ comprises, primarily, an amplifier comprising transistors T11, T21 and T31. The amplifier T11, T21, T31 functions as an integrator due to the differentiating feedback circuit which comprises a capacitor K1 and a resistor $r11$. The triangle wave generator also includes a limit indicator comprising two transistors T41 and T51. The limit value indicator is a bistable multivibrator or flip-flop and is controlled by the output voltage $U_D$ of the integrated amplifier T11, T21, T31 which is provided at a resistor $r21$.

If it is assumed, initially, that the output voltage $U_D$ of the integrated amplifier T11, T21, T31 is zero, then the transistor T51 is initially in its non-conductive condition due to the current flowing via a resistor $r3$. The transistor T41 is in its conductive condition, however, so that the transistor T21 conducts a strong control current which flows via a resistor and the collector-emitter path of the transistor T41. Due to the integrating operation of the amplifier T11, T21, T31, the output voltage $U_D$ of said amplifier may increase only at a specific time constant. When the output voltage $U_D$ increases, the potential at the base electrode of the transistor T51 increases until such time as the current passing through the resistor $r3$ is compensated and said transistor is switched to its conductive condition. This causes the transistor T41 to be switched to its non-conductive condition. The current flow via the transistor T41 is thus so severely decreased that only a small current flows through the resistor connected in its collector-emitter path.

Due to the integrating operation of the amplifier T11, T21, T31, the output voltage $U_D$ of said amplifier varies toward zero only at a specific time constant. At such time, the transistor T51 is again swtiched to its non-conductive condition and the process is repeated. The output voltage $U_D$ thus has a triangle wave form.

The saw-tooth voltage produced by the triangle voltage generator $Dr$ is applied to the base electrode of a transistor T6 of the pulse width modulator G via a coupling capacitor K2. A diode $n3$ is connected in the emitter lead of the transistor T6 and functions to compensate for the base-emitter residual voltage of said transistor. As a result, the transistor T6 is switched to its conductive condition when the triangle voltage acquires a magnitude which is only slightly greater than zero.

The output signal of the transistor T6 is amplified in a transistor T7 which provides an output signal at the output $a2$. A transistor T8 inverts the output signal of the transistor T7 and provides the inverted output signal at the output $a3$.

While the invention has been described by means of specific examples and in a specific embodiment, we do not wish to be limited thereto, for obvious modifications will occur to those skilled in the art without departing from the spirit and scope of the invention.

We claim:

1. Apparatus for voltage-proportional control of the rotary speed of a shaft, comprising
   a pair of DC motors coupled to said shaft via a differential drive;
   a first motor energizing circuit for one of said motors including a source of electrical energy and a first switch connected in series with said one of said motors and said source of electrical energy;
   a second motor energizing circuit for the other of said motors including a source of electrical energy and a second switch connected in series with said other of said motors and said source of electrical energy; and
   control means connected to said first and second switches for controlling the condition of said first and second switches in accordance with a control voltage provided by said control means, said control means including a pulse width modulator for periodically providing pulses having durations proportional to said control voltage, said pulse width modulator having first and second outputs each providing a pulse which is inverse to that provided by the other, said first switch comprising a first switching amplifier connected to the first output of said pulse width modulator and said second switch comprising a second switching amplifier connected to the second output of said pulse width modulator.

2. Apparatus for voltage-proportional control of the rotary speed of a shaft, comprising
   a pair of DC motors coupled to said shaft via a different drive;
   a first motor energizing circuit for one of said motors including a source of electrical energy and a first switch connected in series with said one of said motors and said source of electrical energy;
   a second motor energizing circuit for the other of said motors including a source of electrical energy and a second switch connected in series with said other of said motors and said source of electrical energy; and
   control means connected to said first and second switches for controlling the condition of said first and second switches in accordance with a control voltage provided by said control means, said control means comprising a reference voltage source, pilot means for providing an operating voltage from said first and second motors and a pulse width modulator connected to said first and second switches for periodically providing pulses proportional to the difference between said reference voltage and said operating voltage, said pulse width modulator being connected to said reference voltage source and said pilot means.

3. Apparatus as claimed in claim 1, wherein said pilot means comprises tachometer means coupled to said first and second motors for providing voltages proportional to the rotary speed of said motors, and further comprising a source of saw-tooth voltage.

4. Apparatus as claimed in claim 1, further comprising differential amplifier means having first and second inputs and wherein said reference voltage source is connected to the first input of said differential amplifier means and said pilot means comprises tachometer means coupled to said first and second motors for providing voltages proportional to the rotary speed of said motors, said tachometer means being connected to the second input of said differential amplifier means, said differential amplifier means having an output connected to said pulse width modulator, said differential amplifier means providing at its output a control voltage proportional to the difference between said reference and operating voltages.

5. Apparatus as claimed in claim 4, further comprising a source of triangle voltage and wherein said pulse width modulator has an input connected to said source of triangle voltage and an input connected to the output of said differential amplifier means.

References Cited
UNITED STATES PATENTS

| | | | | |
|---|---|---|---|---|
| 3,146,386 | 8/1964 | Gerber | 318—8 |
| 3,349,309 | 10/1967 | Dannettell | 318—341 |
| 3,351,830 | 11/1967 | Samson | 318—48 |
| 3,401,324 | 9/1968 | James | 318—341 |
| 3,427,506 | 2/1969 | Thiele | 318—341 |
| 3,434,025 | 3/1969 | Parkinson | 318—8 |

ORIS L. RADER, Primary Examiner

A. G. COLLINS, Assistant Examiner

U.S. Cl. X.R.

318—341